(12) United States Patent
Kinugasa

(10) Patent No.: US 7,661,689 B2
(45) Date of Patent: Feb. 16, 2010

(54) ALL TERRAIN VEHICLE

(75) Inventor: Takeshi Kinugasa, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 323 days.

(21) Appl. No.: 11/336,490

(22) Filed: Jan. 20, 2006

(65) Prior Publication Data
US 2007/0170682 A1 Jul. 26, 2007

(51) Int. Cl.
B60G 3/18 (2006.01)
B60G 15/00 (2006.01)

(52) U.S. Cl. .................. 280/124.135; 280/124.145; 280/124.15; 280/124.134

(58) Field of Classification Search .......... 280/124.134, 280/124.135, 124.136, 124.145, 124.15, 280/124.151, 124.154
See application file for complete search history.

(56) References Cited

U.S. PATENT DOCUMENTS

| 4,620,720 | A | * | 11/1986 | Sakata et al. | .......... 280/124.145 |
| 6,105,984 | A | * | 8/2000 | Schmitz et al. | ....... 280/124.136 |
| 6,109,632 | A | * | 8/2000 | Wei | ..................... 280/124.138 |
| 6,516,914 | B1 | * | 2/2003 | Andersen et al. | ............ 180/360 |
| 6,695,329 | B2 | * | 2/2004 | Handa | .................. 280/124.135 |
| 7,159,880 | B2 | * | 1/2007 | Budde et al. | .......... 280/124.128 |
| 7,249,647 | B2 | * | 7/2007 | Nietlispach | ................. 180/190 |
| 2003/0168827 | A1 | * | 9/2003 | La | ....................... 280/124.135 |
| 2004/0140641 | A1 | * | 7/2004 | Eppelein | .............. 280/124.135 |
| 2005/0184481 | A1 | * | 8/2005 | Tanaka et al. | ......... 280/124.134 |
| 2005/0253353 | A1 | * | 11/2005 | Yamamura et al. | .... 280/124.135 |
| 2005/0257993 | A1 | * | 11/2005 | Inui et al. | .................... 180/446 |
| 2006/0197331 | A1 | * | 9/2006 | Davis et al. | ................. 280/781 |
| 2007/0257516 | A1 | * | 11/2007 | Davis et al. | ............ 296/190.09 |

FOREIGN PATENT DOCUMENTS

JP 64-032984 2/1989
JP 2610268 B 2/1997

* cited by examiner

Primary Examiner—Paul N. Dickson
Assistant Examiner—George D. Spisich
(74) Attorney, Agent, or Firm—Keating & Bennett, LLP

(57) ABSTRACT

An all terrain vehicle includes a vehicle frame having lower arms and upper arms for suspending front wheels, the upper arms positioned above the lower arms, drive shafts arranged between the lower arms and the upper arms for conveying drive power from a front wheel differential unit to the front wheels, and shock absorbers including lower ends connected to the lower arms and upper ends connected to the vehicle frame. The shock absorbers are arranged further to the front than the upper arms so as to shorten the front portion of the vehicle frame.

12 Claims, 6 Drawing Sheets

ALL TERRAIN VEHICLE

BACKGROUND OF THE INVENTION

1. Field of the Invention

The present invention relates to an all terrain vehicle for traveling on uneven ground such as wasteland, grassland, and swamps. More particularly, the present invention relates to technology for a vehicle wheel suspension for a four-wheel drive vehicle.

2. Description of the Related Art

In an all terrain vehicle including independent suspensions that suspend left and right front wheels, so-called double wishbone type suspensions are sometimes provided. A double wishbone type suspension is a suspension having a lower arm and an upper arm arranged above the lower arm for suspending a front wheel. These lower arm and upper arms are formed in a V-shape.

Generally, a two-wheel drive all terrain vehicle driven only by rear wheels and provided with a type double wishbone type suspension for the front wheels includes shock absorbers connected to the lower arms (refer, for example, to Japanese Patent No. 2610268).

Specifically, body portions (telescopic portions) of the shock absorbers are arranged at an inner side of the V-shaped upper arms, between front arm portions and back arm portions. Upper ends of the shock absorbers are connected to a vehicle frame, and lower ends of the shock absorbers are connected to the lower arms.

If the shock absorbers are connected to the lower arms in this way, the center of gravity of the vehicle is low compared to when connected to the upper arms. Therefore, a comfortable ride is possible even if the vehicle is traveling over uneven ground.

However, in a four wheel drive all terrain vehicle provided with double wishbone type suspensions, it is difficult to connect the lower ends of the shock absorbers to the lower arms in a similar manner to the above described two-wheel drive vehicle.

That is, a four wheel drive all terrain vehicle includes front wheel drive shafts connecting the front wheels and a differential unit, and the drive shafts are arranged between the lower arms and the upper arms. As a result, the drive shafts obstruct the arrangement of the shock absorbers, and the lower ends of the shock absorbers cannot connect to the lower arms. If the body portions (telescopic portions) of the shock absorbers are positioned in front of or behind the drive shafts, and the lower ends of the shock absorbers are connected to the lower arms so as to avoid the drive shafts, the upper ends of the shock absorbers are likely to contact the upper arms when traveling.

To deal with this, for example, it has been considered as a solution to widen a distance between the front arm portions and the back arm portions of the upper arms in order to remove the danger of the upper portion of the shock absorbers contacting the upper arms. However, with this approach, in order to support the upper arms using the vehicle frame, it becomes necessary to extend the front of the vehicle frame forward. If this is done, when the vehicle moves up and down when traveling on uneven ground, there is a danger that a front lower portion of the vehicle will contact the ground.

SUMMARY OF THE INVENTION

In order to overcome the problems described above, preferred embodiments of the present invention provide a four wheel drive all terrain vehicle that includes shock absorbers connected to lower arms without contacting the upper arms and without extending the front portion of the vehicle frame forward.

An all terrain vehicle according to a preferred embodiment of the present invention is provided with lower arms connected to a vehicle frame for suspending front wheels, upper arms positioned above the lower arms and connected to the vehicle frame for suspending the front wheels together with the lower arms, drive shafts arranged between the lower arms and the upper arms for conveying drive power from a front wheel differential unit to the front wheels, and shock absorbers including lower ends connected to the lower arms and upper ends connected to the vehicle frame. The shock absorbers are arranged in front of the upper arms.

According to the present preferred embodiment, lower ends of the shock absorbers are connected to the lower arms. Also, since the upper arms are arranged behind the shock absorbers, it is possible for the vehicle frame to support the upper arms without extending the vehicle frame forward. As a result, a vehicle with a small front portion of the vehicle frame is achieved. A lower side portion of the vehicle is prevented from contacting the ground even when the vehicle moves up and down when traveling.

With another preferred embodiment of the present invention, each of the upper arms includes an upper front arm portion, and an upper back arm portion connected to a front wheel side portion of the upper front arm portion and arranged behind the upper front arm portion. Each of the upper front arm portions includes a mid portion arranged behind the shock absorber, and is bent toward the front so that at least one of a vehicle frame side end and a front wheel side end is positioned further forward in a vehicle traveling direction than the mid portion.

There may be instances where an external force is applied to the upper arm in a front and rear direction of the vehicle body. With this preferred embodiment, the upper arms are bent forward. Therefore, since a distance between a vehicle frame side end of the upper back arm portion and a vehicle frame side end of the upper front arm portion becomes large, an upper arm that is strongly resistant against a moment due to external force in the front and rear direction is achieved.

With another preferred embodiment of the present invention, each of the lower arms includes a lower front arm portion and a lower back arm portion connected to a vehicle side portion of the lower front arm portion and arranged behind the lower front arm portion. Lower ends of the shock absorbers are connected to the lower front arm portions.

According to this preferred embodiment, since the lower ends of the shock absorbers are connected to the lower front arm portions, shocks applied at the front portion of the vehicle when traveling can be absorbed more effectively.

Also with this preferred embodiment, it is preferable for each of the lower front arm portions to be thicker than the lower back arm portions. If this is the case, it is possible to increase the strength of the lower front arm portions to which the shock absorbers are connected.

Also with this preferred embodiment, it is preferable for each of the lower front arm portions to include a frame side pivot shaft supported by the vehicle frame, the lower front arm portions extending in a direction perpendicular to the vehicle side pivot shaft. In this way, the upward and downward movement of the lower front arm portions becomes smoother.

Also with this preferred embodiment, it is preferable for the front lower arm portions to extend in a direction perpendicular to the vehicle frame. In this way, the lower front arm portions are shorter compared to when the lower front arm portions extend diagonally, and so the strength of the vehicle frame is increased.

Also with this preferred embodiment, it is preferable for each of the shock absorbers to be arranged on a vertical plane including the lower front arm portions. With this arrangement, external forces applied to the shock absorbers due to upward and downward movement of the front wheels when traveling on rough ground is applied in the telescopic motion direction of the shock absorbers. This means that shocks at the time of travel are absorbed more effectively.

Also with this preferred embodiment, it is preferable for the lower front arm portions to be bent so that the front wheel side portions are positioned lower down than a mid portion. If this is done, since the vehicle frame side of the lower front arm portions are positioned at a higher position, obstacles on the ground are prevented from colliding with the lower front arm portions when traveling on rough ground.

It is still further preferable with this preferred embodiment for each of the lower front arm portions to extend outward in a vehicle width direction and then be bent downwards at a bent portion. Lower ends of the shock absorbers are connected to the bent portions. In this manner, since the bent portions of the lower front arm portions are bent downward, strength of the bent portions is increased. Also in this case, it is preferable for attachment brackets projecting upward to be provided at the bent portions of the lower front arm portions, and for the lower ends of the shock absorbers to be connected to the attachment brackets.

With another preferred embodiment of the present invention, it is preferable for the vehicle frame to include a front pipe portion extending upward from a lower portion of the vehicle, and for upper ends of the shock absorbers to be connected to the front pipe portion.

If the shock absorbers are connected to a portion of the vehicle frame that extends in a front and rear direction, a bending moment acts between a pipe portion extending in a front and rear direction and a front pipe portion extending upwards from the lower portion of the vehicle frame. If upper ends of the shock absorbers are connected to the front pipe portion as in this preferred embodiment, this bending moment does not act, and durability of the vehicle frame is improved.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
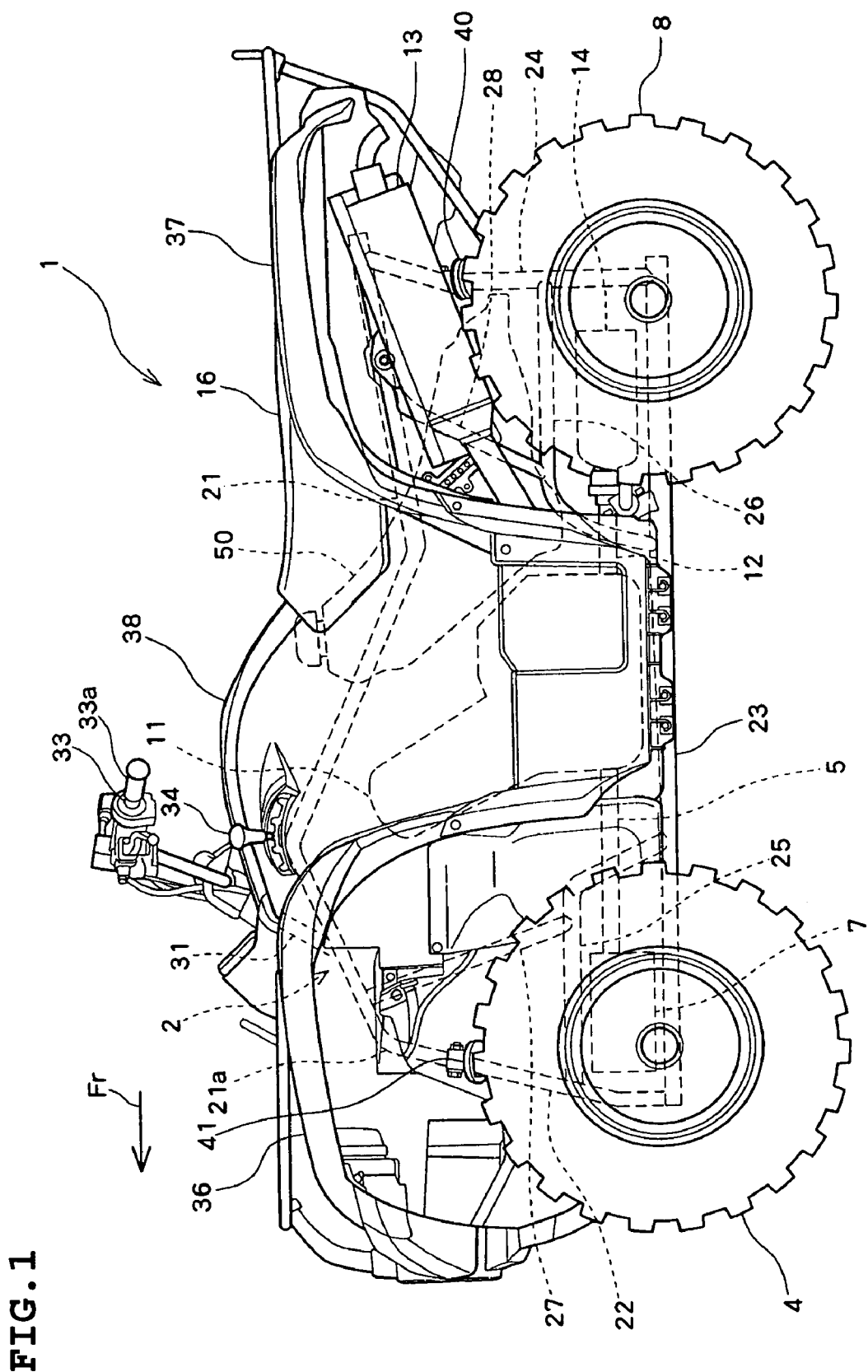
FIG. 1 is a left side elevation of an all terrain vehicle according to a preferred embodiment of the present invention.
Figure 2:
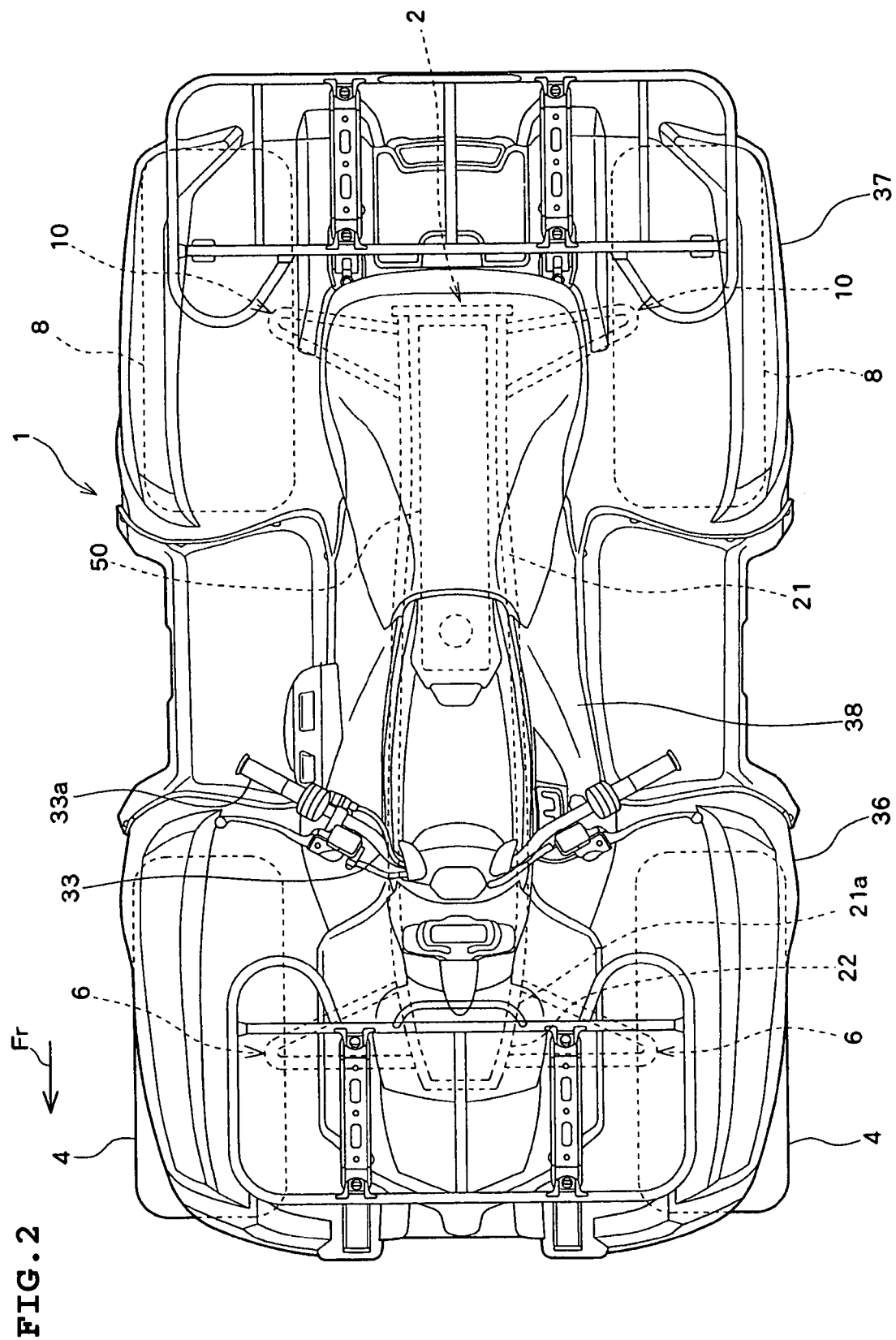
FIG. 2 is a plan view of the all terrain vehicle in FIG. 1.
Figure 3:
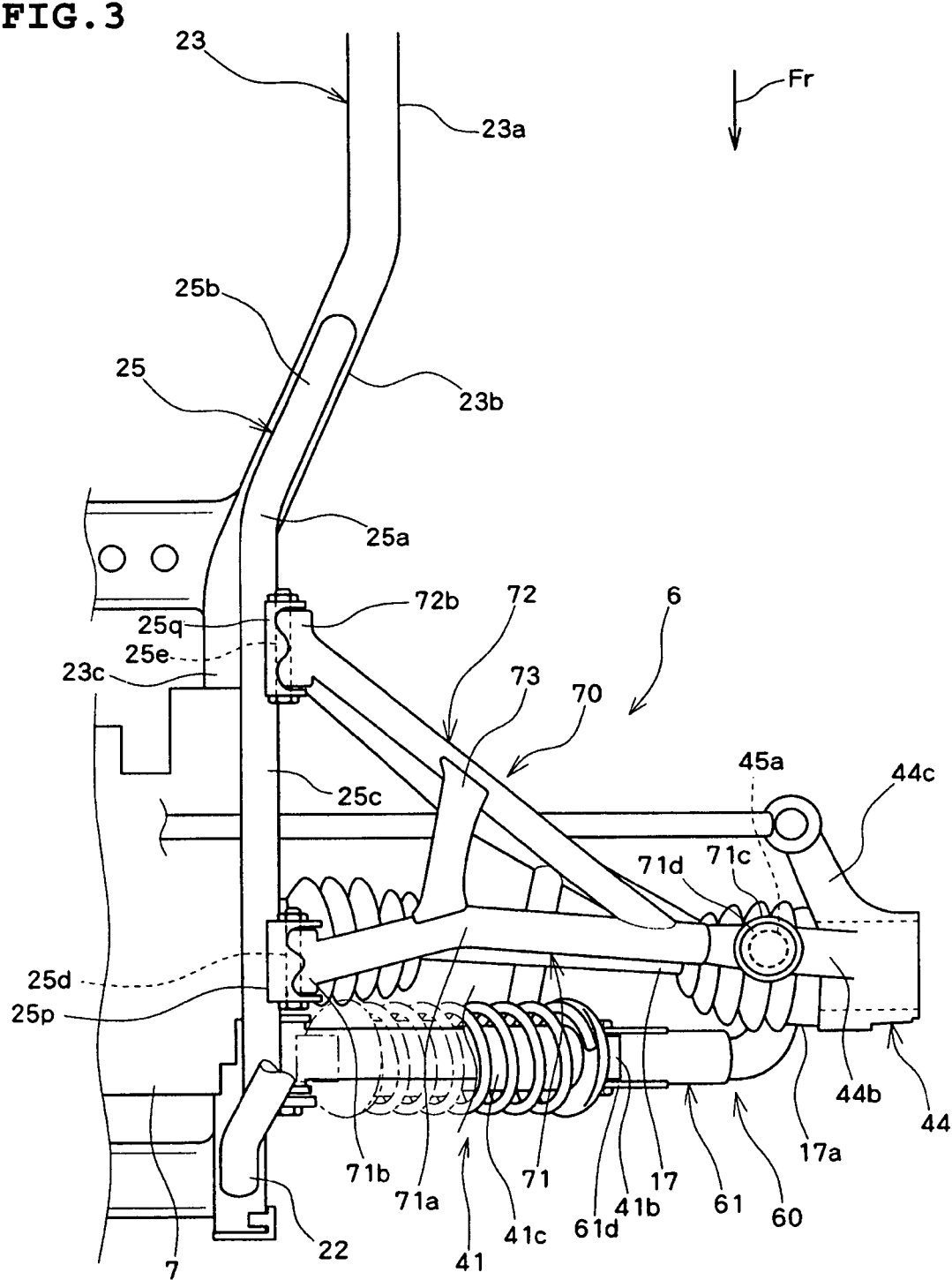
FIG. 3 is a plan view of a front wheel suspension provided in the all terrain vehicle, wherein an upper portion of the shock absorbers included in the front wheel suspension is shown by chain two-dotted lines.
Figure 4:
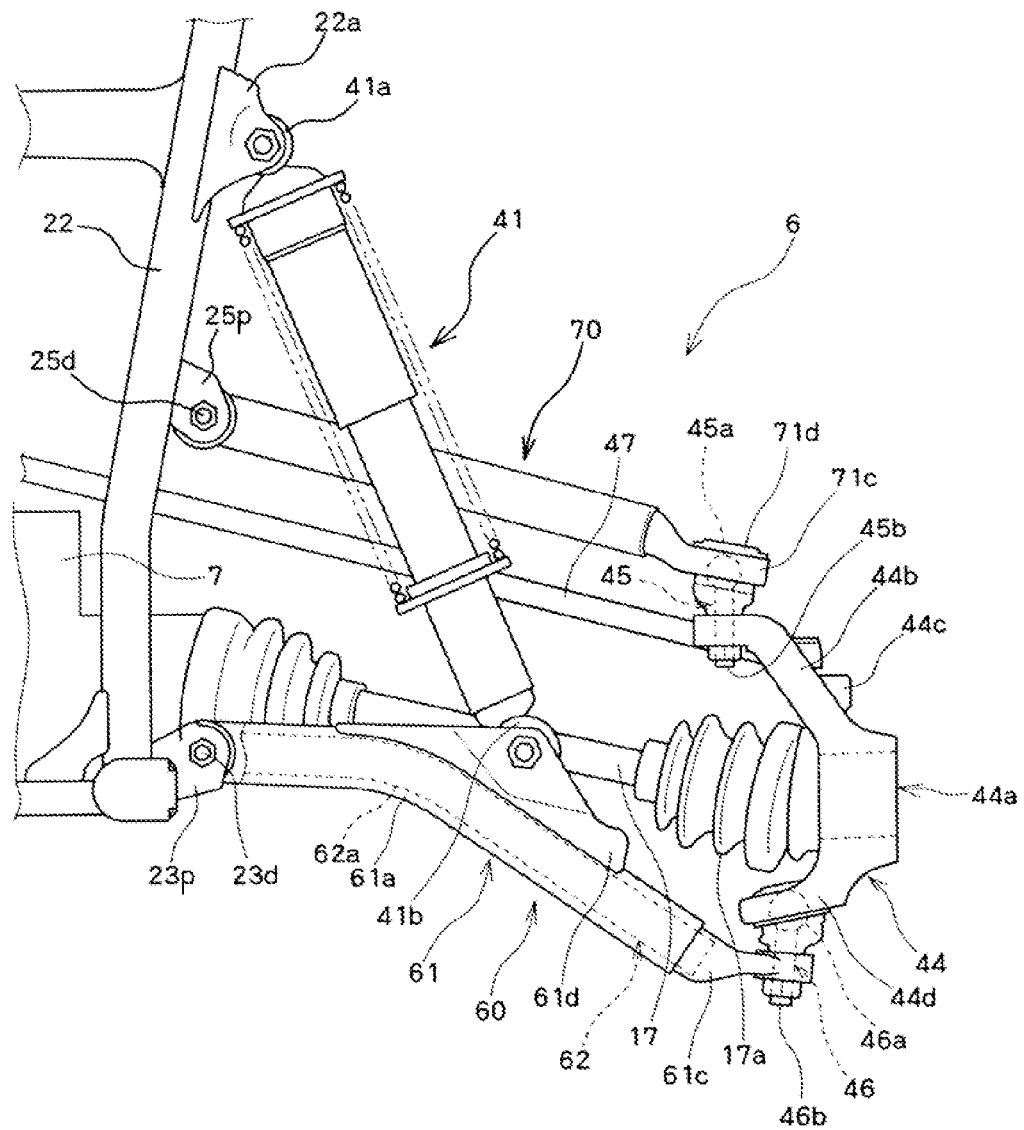
FIG. 4 is a front view of the front wheel suspension.
Figure 5:
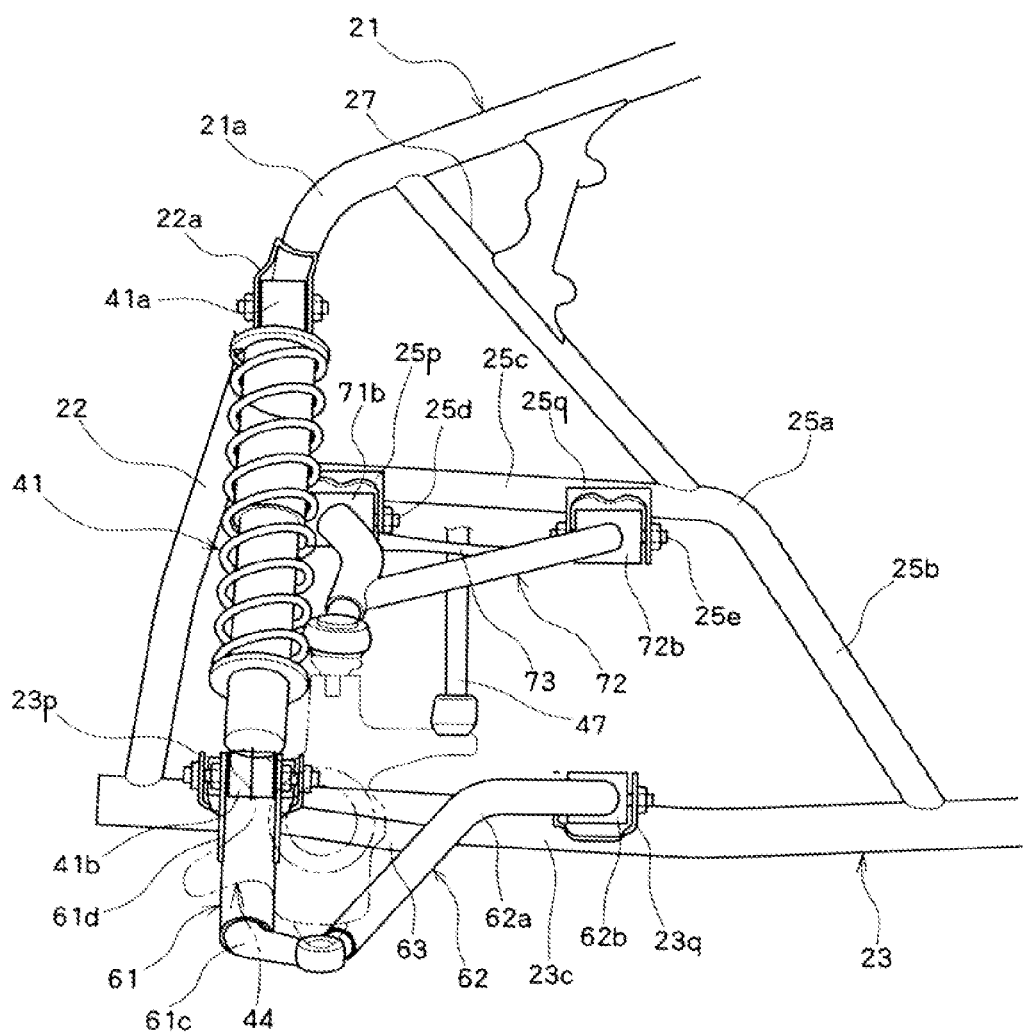
FIG. 5 is a side view of the front wheel suspension, wherein knuckles supporting front wheels are shown by chain two-dotted lines.
Figure 6:
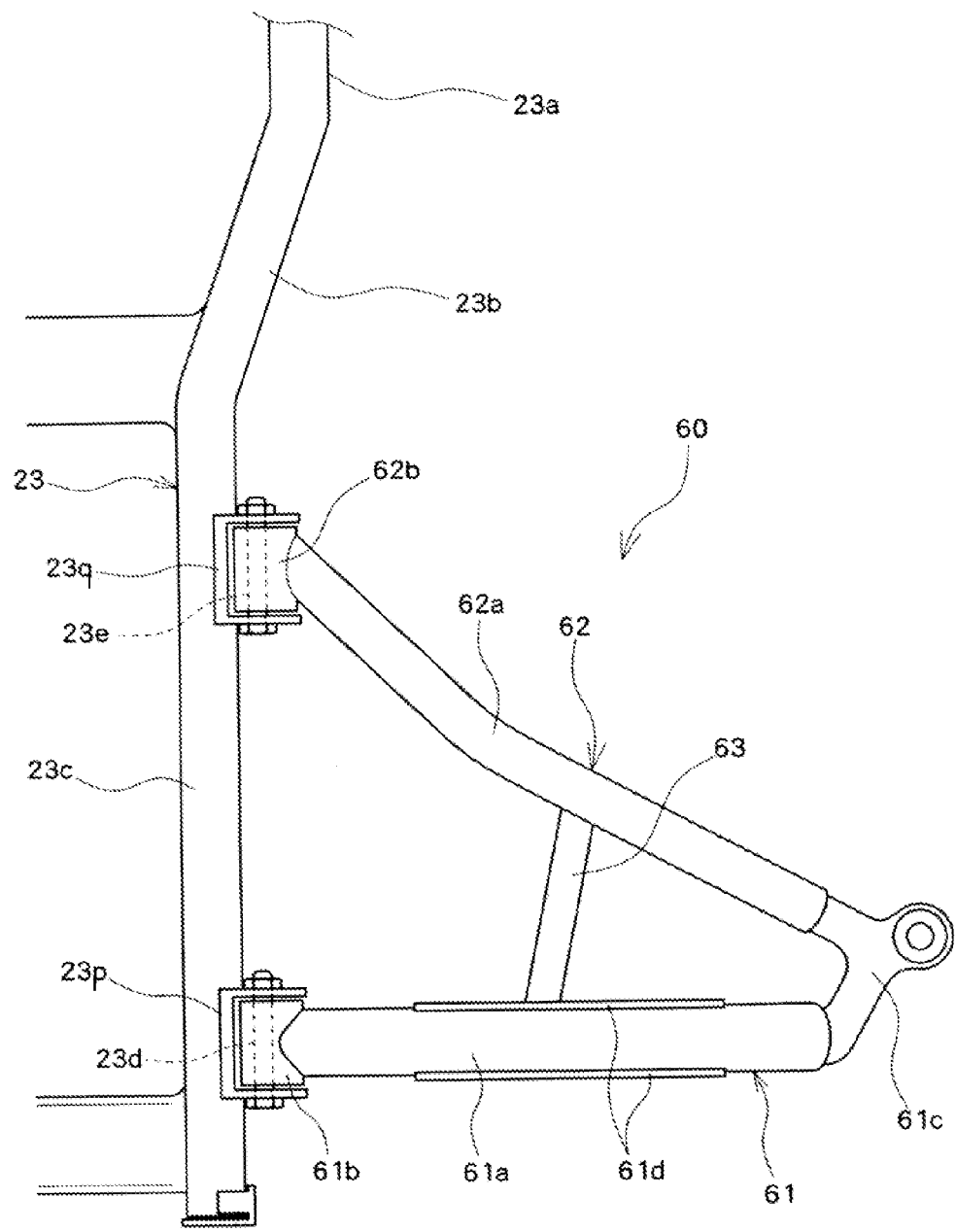
FIG. 6 is a plan view of a front side lower arm provided in the front wheel suspension.

An all terrain vehicle of a preferred embodiment of the present invention will be described in the following with reference to the drawings. FIG. 1 is a left side elevation of an all terrain vehicle 1 of this preferred embodiment, and FIG. 2 is a plan view of the all terrain vehicle 1. FIG. 3 is a plan view of a front wheel suspension 6 provided in the all terrain vehicle 1, FIG. 4 is a front view of the front wheel suspension 6, and FIG. 5 is a side view of the front wheel suspension 6. FIG. 6 is a plan view of a front side lower arm 60 provided in the front wheel suspension 6.

An all terrain vehicle 1 is a four wheel drive vehicle capable of traveling on mud, sand, snow-covered roads, etc. Drive power output from an engine unit 11 is conveyed to left and right front wheels 4, 4, and left and right rear wheels 8, 8. The front wheels 4 are arranged at a front side lower portion of the vehicle and the rear wheels 8 are arranged at a rear side lower portion.

Specifically, as shown in FIG. 1, a front end of a rear wheel output shaft 12 extending in a front and rear direction is connected to the engine unit 11. A rear end of the output shaft 12 is connected to a rear wheel reduction unit 14 arranged at a rear lower portion of the vehicle. The reduction unit 14 and axles of the rear wheels 8 are connected to each other by rear wheel drive shafts (not shown) extending in the vehicle width direction. Drive power output from the engine unit 11 is conveyed to the rear wheels 8 via the output shaft 12, the reduction unit 14, and the rear wheel drive shafts. Exhaust gas emitted from the engine unit 11 is discharged to the rear (opposite direction to the direction shown by Fr in FIG. 1 and FIG. 2) from a muffler 13 arranged above the left rear wheel 8.

A rear end of a front wheel output shaft 5 extending in the front and rear direction is also connected to the engine unit 11. A front end of the output shaft 5 is connected to a front wheel differential unit 7 arranged at a front side lower portion of the vehicle. One end of the front wheel drive shaft 17 extending in the vehicle width direction is connected to the differential unit 7 (refer to FIG. 3). The other end of the drive shaft 17 is connected to an axle of the front wheel 4 via a constant velocity joint (not shown). When traveling, this constant velocity joint conveys drive power while moving up and down with the front wheel 4. Drive power output from the engine unit 11 is conveyed to the front wheels 4 via the output shaft 5, the differential unit 7, the drive shafts 17, and the constant velocity joints.

Knuckles 44 are arranged at an inner side of the rims of the front wheels 4, and the constant velocity joint is arranged at an inner side of a hole provided in a central portion 44a of each knuckle 44. A portion of the drive shaft 17 connected to the constant velocity joint is covered by a drive shaft boot 17a (refer to FIG. 3).

A saddle type seat 16 for a passenger to sit on is arranged at a rear portion of the vehicle (refer to FIG. 1). A handlebar 33 for a user to steer the vehicle is arranged above a front portion of the engine unit 11. A steering shaft 31 extending diagonally downward is attached to a central portion of the handlebar 33. Grips 33a are also attached to the left and right ends of the handlebar 33. A gear shift lever 34 for a rider to change gears is arranged below the left grip 33a.

The all terrain vehicle 1 is provided with a front fender 36 arranged above the left and right front wheels 4, 4, a rear fender 37 arranged above the rear wheels 8, 8, and a cowling 38 covering a side front portion of the fuel tank 50, the engine unit 11, etc. The front fender 36, rear fender 37, and cowling 38 function as a mudguard.

The vehicle frame 2 of the all terrain vehicle 1 includes left and right upper pipes 21 that extend in the front and rear direction of the vehicle. The upper pipes 21 define an upper portion of the vehicle frame 2 (refer to FIG. 1). Each upper pipe 21 includes bent portions 21a bent downwards at front ends. Front pipe portions 22 extending from the bent portions 21a are inclined diagonally downwards. The vehicle frame 2 is provided with lower pipes 23 that define a lower portion of the vehicle frame 2 and extend in the front and rear direction of the vehicle. Front ends of the lower pipes 23 are joined to the lower ends of the front pipe portions 22. The vehicle frame 2 is provided with rear pipes 24 extending upwards from the rear ends of the lower pipes 23 and joined to rear ends of the upper pipes 21.

The vehicle frame 2 is also provided with substantially L-shaped left and right front suspension arm support pipes 25, 25, and similarly substantially L-shaped left and right rear suspension arm support pipes 26, 26. Front ends of the front suspension arm support pipes 25 are joined to mid portions of the front pipe portions 22. The front suspension arm support pipes 25 extend rearward from front ends (in an opposite direction to the direction shown by Fr in FIG. 1), and bend downward at bent portions 25a. The lower ends are joined to the lower pipes 23 (refer to FIG. 5).

Rear ends of the rear suspension arm support pipes 26 are joined to the rear pipes 24. The rear suspension arm support pipes 26 extend forward from the rear ends (in the direction shown by Fr in FIG. 1), then bend downward, and lower ends are joined to the lower pipes 23.

Front reinforcement pipes 27 are fastened between the front suspension arm support pipes 25 and portions slightly to the rear of the bent portions 21a of the upper pipes 21. Rear reinforcement pipes 28 are also fastened between the rear suspension arm support pipes 26 and the upper pipes 21. A plurality of cross members are fastened between the left and right upper pipes 21, 21 and the left and right lower pipes 23, 23.

Left and right front wheels 4, 4 are suspended respectively by the left and right front wheel suspensions 6, 6. The left and right rear wheels 8, 8 are suspended respectively by the left and right rear wheel suspensions 10, 10 (refer to FIG. 4). The front wheel suspensions 6 and the rear wheel suspensions 10 define a so-called double wishbone type suspension. Each of the rear wheel suspensions 10 includes a rear side lower arm (not shown) connected to a rear portion of the lower pipe 23, and a rear side upper arm (not shown) connected to the rear suspension arm support pipe 26. The rear wheel suspensions 10 are capable of moving up and down together with the rear wheels 8. Rear wheel shock absorbers 40 for damping vibrations at the time of traveling are fixed to the rear lower arms.

Each of the front wheel suspensions 6 includes a front side lower arm 60 (described as a lower arm in the following) and a front side upper arm 70 (described as an upper arm in the following) arranged above the lower arm 60 (refer to FIG. 3 to FIG. 5). The front wheel suspensions 6 are supported by lower pipes 23 and the front suspension arm support pipes 25 so as to be capable of moving up and down together with the front wheels 4.

Specifically, each of the lower pipes 23 is provided with a central portion 23a supporting the engine unit 11, an inclined portion 23b inclined inward in a vehicle width direction extending from the front end of the central portion 23a, and a lower arm support portion 23c extending from the front end of the inclined portion 23b (refer to FIG. 3 and FIG. 6). The lower arms 60 are connected to the lower arm support portions 23c.

As described above, each of the front suspension arm support pipes 25 are formed in a substantially L-shape, and is provided with an upper arm support portion 25c extending rearward from a front end and an inclined portion 25b inclined downward from the bent portion 25a. The upper arms 70 are connected to the upper arm support portions 25c.

The front wheel 4 side ends (lateral end portions in the vehicle width direction) of the lower arms 60 and the upper arms 70 are connected to the knuckles 44 for supporting axles of the front wheels 4.

Each of the knuckles 44 includes knuckle arms 44c extending to the rear. Tie rods 47 for conveying a steering force of the handle bar 33 to the knuckles 44 are connected to the knuckle arms 44c. The above described front wheel drive shafts 17 are arranged between the lower arms 60 and the upper arms 70. The front wheel shock absorbers 41 are fixed to the lower arms 60 and the front pipe portions 22 (refer to FIG. 3 to FIG. 5).

The front wheel suspensions 6 will now be described in detail based on FIG. 3 to FIG. 5. In the following, the left side suspension 6 will be described, but the right side suspension 6 is similar in structure to the left side. First, the upper arm 70 will be described.

The upper arm 70 is formed in a substantially V-shape. The upper arm 70 is provided with an upper back arm portion 72 extending diagonally backward and inward (towards the center portion) in the vehicle width direction from the end portion of the front wheel 4 side, and a front upper arm 71 extending in a vehicle width direction in front of the upper back arm portion 72 (refer to FIG. 3).

The upper front arm portion 71 extends from a front wheel 4 side toward the upper arm support portion 25c, bends slightly forward at a bent portion 71a, and extends from the bent portion 71a diagonally forward towards the upper arm support portion 25c (refer to FIG. 3). The bent portion 71a is positioned behind a body portion (telescopic portion) 41c of the shock absorber 41. By having the upper front arm portion 71 bent at the bent portion 71a, an end of the upper front arm portion 71 connected to the upper arm support portion 25c is positioned further forward than the bent portion 71a, when viewed in plan.

The upper front arm portion 71 includes a pipe shaped boss portion 71b with a center line parallel to the upper arm support portion 25c, at an upper arm support portion 25c side. Brackets 25p and 25q that project outward in the vehicle width direction are fixed to the front portion and rear portion of the upper arm support portion 25c. A frame side pivot shaft 25d parallel to the upper arm support portion 25c is inserted into the pipe-shaped boss portion 71b. The bracket 25p supports this frame side pivot shaft 25d and boss portion 71b axially. In this way, the upper front arm portion 71 is connected to the front side upper arm support portion 25c and is capable of moving up and down.

The upper front arm portion 71 includes a substantially annular ball joint support portion 71c at a front wheel 4 side end. The knuckle 44 includes an upper arm connection portion 44b extending from a central portion diagonally upward and inward in the vehicle width direction. The ball joint support portion 71c is connected to the upper arm connection portion 44b via the ball joint 45 (refer to FIG. 4).

Specifically, the ball joint 45 includes a joint ball portion 45a at a head portion of the ball joint 45, and a connection portion 45b extending downwards from the joint ball portion 45a. The ball joint portion 45a is supported at an inner side of the annular ball joint support portion 71a so as to be capable of rotating. A lower end of the connection portion 45b is fixed with bolts to the upper arm connecting portion 44b of the knuckle 44. The ball joint portion 45a is closed off from above with a cap 71d.

Front wheel 4 side end portion of the upper back arm portion 72 is joined to front wheel 4 side end portion of the upper front arm portion 71. The upper back arm portion 72 extends diagonally rearward and inward from the front wheel 4 side end portion. The upper back arm portion 72 includes a pipe shaped boss portion 72b with a center line parallel to the upper arm support portion 25c, at an upper arm support portion 25c side end portion. A frame side pivot shaft 25e is inserted into the boss portion 72b. A bracket 25q fixed to the upper arm support portion 25c axially supports the frame side pivot shaft 25e and the boss portion 72b.

In this way, the upper arm 70 provided with the upper back arm portion 72 and the upper front arm portion 71 is connected to the upper arm support portion 25c at the boss portions 71b, 72b, so as to be capable of moving up and down. A reinforcement member 73 is arranged between the upper front arm portion 71 and the upper back arm portion 72.

Next, the lower arm 60 will be described. As shown in FIG. 6, the lower arm 60 is formed in a substantially V-shape when viewed in plan. The lower arm 60 includes a lower back arm portion 62 extending diagonally rearward and inward (toward a center portion in the vehicle width direction) from a front wheel side, and a lower front arm portion 61, thicker than the lower back arm portion 62, extending in a vehicle width direction in front of the lower back arm portion 62.

When viewed from the front, the lower front arm portion 61 extends from the lower arm support portion 23c side of the lower pipe 23 toward the outside in the vehicle width direction, bends downwards at a bent portion 61a, and then extends from the bent portion 61a diagonally downwards (refer to FIG. 4).

The lower front arm portion 61 includes a pipe-shaped boss portion 61b with a center line parallel to the lower arm support portion 23c at a lower arm support portion 23c side end. A bracket 23p projecting outward in the vehicle width direction is fixed to the front end of the lower arm support portion 23c. A bracket 23q projecting to the outside is fixed to the rear portion of the lower arm support portion 23c. A frame side pivot shaft 23d parallel to the lower arm support portion 23c is inserted into the boss portion 61b. The bracket 23p axially supports this frame side pivot shaft 23d and the boss portion 61b. The lower front arm portion 61 is therefore connected to the lower arm support portion 23c so as to be capable of moving up and down.

Looking at a plan view, the lower front arm portion 61 extends in a perpendicular direction with respect to this frame side pivot shaft 23d and the lower arm support portion 23c.

The lower front arm portion 61 includes a knuckle connection portion 61c projecting diagonally backward and outward at a front wheel 4 side end portion. The knuckle 44 includes a ball joint support portion 44d formed in an annular shape at a lower portion of the knuckle 44. The ball joint support portion 44d supports the ball joint 46. The ball joint portion 46a of the ball joint 46 is capable of rotation in the ball joint support portion 44d. The knuckle connection portion 61c is fixed with bolts to a connection portion 46b extending downwards from the ball joint portion 46a.

A front wheel shock absorber 41 is arranged between the lower front arm portion 61 and the front pipe portion 22. Specifically, a lower end portion of the front pipe portion 22 is connected to a front end portion of the lower pipe 23. The front pipe portion 22 extends upward from the lower end with a slight inclination to the rear. An upper end portion 41a of the front wheel shock absorber 41 is fixed to a bracket 22a that is provided on an upper end of the front pipe portion 22 (refer to FIG. 5). As shown in FIG. 3, the front wheel shock absorber 41 is arranged on a vertical plane including the lower front arm portion 61. A lower end portion 41b is fixed to a bracket 61d that is triangular when viewed from the front, projecting upward from the bent portion 61a (refer to FIG. 4). The lower end portion 41b of the front wheel shock absorber 41 is substantially positioned in a horizontal plane including the lower arm support portion 23c, when viewed from the front.

The lower back arm portion 62 extends diagonally forward towards the front wheel 4 side from the lower arm support portion 23c, when viewed in plan. Also, when viewed from the front, the lower back arm portion 62 extends from the lower arm support portion 23c side end portion towards the front wheel 4, bends downward at a bent portion 62a, and then extends from the bent portion 62a diagonally downward (refer to FIG. 4). A front wheel 4 side end portion of the lower back arm portion 62 is connected to the knuckle connection portion 61c (refer to FIG. 6). The lower back arm portion 62 is positioned behind the lower front arm portion 61, and in FIG. 4 is shown by a chain line.

The lower back arm portion 62 includes a boss portion 62b at a lower arm support portion 23c side end portion. A frame side pivot shaft 23e parallel to the lower arm support portion 23c is inserted into this boss portion 62b. A bracket 23q of the lower arm support portion 23c axially supports this frame side pivot shaft 23e and the boss portion 62b. The lower back arm portion 62 and the lower front arm portion 61 are therefore connected to the lower arm support portion 23c in these boss portions 62b, 61b so as to be capable of moving up and down. A reinforcement pipe 63 is arranged between the lower back arm portion 62 and the lower front arm portion 61.

As has been described above, the lower arm 60 and the upper arm 70 are respectively connected via the ball joints 45, 46 to the knuckle 44. As a result, the front wheel 4 is reliably kept in contact with the ground, even when traveling on an uneven road surface because an angle between the arm and the knuckle 44 is changed accompanying upward and downward movement of the lower arm 60 and the upper arm 70.

With the above described all terrain vehicle 1, since the lower end portion of the front wheel shock absorber 41 is connected to the lower arm 60, the position of the gravity center of the vehicle 1 is lowered. Therefore, comfortable travel is possible even over rough ground. Since the upper arm 70 is positioned behind the front wheel shock absorber 41, it is possible for the front wheel shock absorber 41 to avoid contacting the upper arm 70 and it is possible to shorten the front portion of the vehicle frame 2 and reduce front overhang. As a result, contact of the front lower portion of vehicle with the ground is prevented.

Preferably, the upper front arm portion 71 provided in the above described all terrain vehicle 1 is bent at the bent portion 71a. However, it is also possible to position the mid portion of the upper front arm portion 71 behind the front wheel shock absorber 41, and to curve the upper front arm portion 71 in an arc so that at least one of the upper arm support portion 25c side end or the front wheel 4 side end of the upper front arm portion 71 is positioned further forward than the mid portion.

Preferably, the lower front arm portion 61 provided in the above described all terrain vehicle 1 is bent at the bent portion 61a. However, it is also possible to curve the lower front arm portion 61 in an arc so that the front wheel 4 side end of the lower front arm portion 61 is positioned below the lower arm support portion 23c side end portion.

In the above description, an all terrain vehicle 1 has been described as a vehicle capable of handling all types of terrain, but the present invention is not thus limited. It is also applicable to a general vehicle including four wheel drive provided with a double wishbone type suspension for traveling on rough ground.

The present invention is not limited to the above-described preferred embodiments, but can be modified within the scope of the attached claims. Further, the technologies disclosed in above-described preferred embodiments can be used in combination, as desired.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An all terrain vehicle comprising:
   a vehicle frame including lower arms and upper arms for suspending front wheels, each of the lower arms including a first portion connected to the vehicle frame and a second portion connected to a front wheel, the first portion extending generally horizontally from the vehicle frame and the second portion extending obliquely downward from the first portion to the front wheel;
   drive shafts arranged between the lower arms and the upper arms and to convey drive power to the front wheels; and
   shock absorbers each having a lower end connected to an inclined portion of the second portion of the lower arms and an upper end connected to the vehicle frame; wherein
   the shock absorbers are arranged in front of the upper arms in the vehicle travel direction;
   attachment brackets are joined to each of the lower arms in a range covering at least a portion of the inclined portion of the second portion and at least a portion of the first portion, and the lower ends of the shock absorbers are connected to the attachment brackets; and
   the lower end of each shock absorber is positioned lower than a top end of the first portion of each lower arm.

2. The all terrain vehicle of claim 1, wherein each of the upper arms includes an upper front arm portion arranged behind the shock absorber, and an upper back arm portion arranged behind the upper front arm portion and connected to the upper front arm portion adjacent the front wheel.

3. The all terrain vehicle of claim 2, wherein each of the upper front arm portions includes a mid portion arranged behind the shock absorber and bent forward so that at least one end of the upper front arm portion is positioned further forward in the vehicle travel direction than the mid portion.

4. The all terrain vehicle of claim 1, wherein each of the lower arms includes a lower front arm portion and a lower back arm portion arranged behind the lower front arm portion and connected to the lower front arm portion adjacent the front wheel, wherein lower ends of the shock absorbers are connected to the lower front arm portions.

5. The all terrain vehicle of claim 4, wherein the lower front arm portions are thicker than the lower back arm portions.

6. The all terrain vehicle of claim 4, wherein the first portion of each of the lower front arm portions is supported by a pivot shaft supported by the vehicle frame, the first portion of the lower front arm portions extending in a direction that is substantially perpendicular to the pivot shaft.

7. The all terrain vehicle of claim 4, wherein the first portions of the lower front arm portions extend in a direction that is substantially perpendicular to the vehicle frame.

8. The all terrain vehicle of claim 4, wherein each of the shock absorbers is arranged in a vertical plane including the lower front arm portion.

9. The all terrain vehicle of claim 4, wherein each of the lower front arm portions is bent so that an end of the second portion of the lower front arm portion adjacent the front wheel is positioned lower than a mid portion.

10. The all terrain vehicle of claim 4, wherein each of the lower front arm portions extends outward in a vehicle width direction and is bent downwards at a bent portion between the first portion and the second portion.

11. The all terrain vehicle of claim 1, wherein the vehicle frame includes a front pipe portion extending upwards from a lower pipe portion of the vehicle, wherein upper ends of the shock absorbers are connected to the front pipe portion.

12. The all terrain vehicle of claim 1, wherein each of the inclined portions of the second portions of the lower front arm portions are substantially linear.

\* \* \* \* \*